United States Patent [19]

Weiser et al.

[11] Patent Number: 5,048,073
[45] Date of Patent: Sep. 10, 1991

[54] TELEPHONE LINE SWITCHING INTERFACE UNIT

[76] Inventors: Isaac Weiser; Margaret A. Weiser, both of 4760 Corbin, Tarzana, Calif. 91356

[21] Appl. No.: 481,519

[22] Filed: Feb. 20, 1990

[51] Int. Cl.$^5$ .................... H04M 11/00; H04M 3/42; H04M 1/64
[52] U.S. Cl. ...................... 379/63; 379/61; 379/67; 379/210; 379/90
[58] Field of Search .............. 379/58, 61-63, 379/67, 90, 94, 100, 102, 103, 210, 211, 96-98, 195

[56] References Cited

U.S. PATENT DOCUMENTS

| | | | |
|---|---|---|---|
| 4,392,023 | 7/1983 | Sears | 379/98 |
| 4,444,999 | 4/1984 | Sparrevohn | 379/195 |
| 4,691,338 | 9/1987 | Makino | 379/61 |
| 4,809,317 | 2/1989 | Howe et al. | 379/98 |
| 4,821,312 | 4/1989 | Horton et al. | 379/102 |
| 4,825,465 | 4/1989 | Ryan | 379/100 |
| 4,850,008 | 7/1989 | Berg et al. | 379/100 |

Primary Examiner—Jin F. Ng
Assistant Examiner—Dwayne D. Bost
Attorney, Agent, or Firm—Cislo & Thomas

[57] ABSTRACT

A telephone line switching interface unit (10) connected between a telephone set (50) such as a multi-line telephone and a telephone accessory unit (60) that includes cordless telephones, FAX machines and telephone answering/recording machines. When the telephone accessory unit (60) is "on hook", an arriving telephone signal is answered normally at the telephone set (50). However, when the accessory unit (60) is placed "off hook", the control electronics, circuit elements (12)-(36), in the interface unit (10) cause the telephone signal arriving at the telephone set (50) to be automatically switched to and answered by the telephone accessory unit (60). The need for the accessory unit (10) arose from the problems encountered in connecting telephone accessories into multi-line telephones. The interface unit (10) solves this problem by including circuit elements (12)-(36) that allow the interface connection and that compensate for the various types of telephone sets and their corresponding wiring configurations and operational signal levels.

27 Claims, 5 Drawing Sheets

TELEPHONE LINE SWITCHING INTERFACE UNIT

TECHNICAL FIELD

The invention pertains to general field of telephone interface units and more particularly to a telephone line switching interface unit that alloWs a telephone accessory, remotely connected to the unit, to automatically receive a telephone signal first received at a remotely connected telephone set.

BACKGROUND ART

Since telephone deregulation, the industry has expanded to a point where today, there is a myriad of telephone set designs which include single set units, multi-line units, also known as key systems, telephone accessories, and to a lessor degree there are also differences in telephone operating systems. Telephone accessories include cordless radio-linked telephone sets, FAX machines, telephone message recorders, computer modems and other telephone accessories that control various household items by means of a TOUCHTONE ® telephone or an enhanced rotary dial or pulse system. TOUCHTONE is a registered trademark of American Telegraph and Telephone Inc. of New York, United States of America.

One of the prevalent problems encountered in many currently available telephone sets and systems is the difficulty in physically and automatically connecting the telephone accessory into the telephone set. This connection is especially difficult when connection is being made to a multi-line telephone set or other combination multi-use telephone systems.

The difficulty in connecting accessories to the telephone set is further complicated by the fact that their is no longer a "standard telephone". The lack of standardization extends to the wiring configuration at the connector to the signal levels required to operate the system. Additionally, timing problems and particularly timing problems in combination with the various dial tones can cause the incoming or connection calls to be aborted When international systems are considered, the connection problems is further compounded. The instant invention solves most, if not all of the above telephone set/system problems A search of the prior art did not disclose any patents that read directly on the claims of the instant invention however, the following United States patents were considered related:

| U.S. PAT. NO. | INVENTOR | ISSUED |
| --- | --- | --- |
| 4,538,028 | Gazzoli, et al | 27 August 1985 |
| 4,291,197 | Yonaga | 22 Sept. 1981 |

The Gazzoli et al patent discloses an apparatus that functions as an interface between a wireless telephone base unit (input) and a key telephone system (output) that, in turn, is connected to a telephone central office (TCO). The apparatus includes circuitry that establishes a plurality of telephone calling numbers for the outside lines to be used by a user of the wireless handset. As a consequence, when the key telephone system output circuits are connected to the TCO, a wireless link, via the apparatus is established with the wireless telephone Thus, a user of the wireless telephone can use the handset to perform all the functions now performed by a stationary key telephone system while retaining the freedom of motion provided by the wireless telephone.

The Yonaga patent discloses a cordless telephone system which includes a remote station having a transmitter and receiver and a base station having a base transmitter and receiver. The remote station includes a pulse code device that generates a pulse signal corresponding to at least one predetermined decimal number. The pulse signal is transmitted and received by the base station where, through a discriminator, the system determines if the pulse signal corresponds to a predetermined decimal number If their is correspondence, the signal is enabled. Circuit means are also provided to disable the signal at the conclusion of the transmission and to reset the system to await a subsequent transmission from the remote station.

DISCLOSURE OF THE INVENTION

The telephone line switching interface unit is designed to be connected between a telephone set, which includes multi-line telephones or key systems, and a telephone accessory unit such as a cordless telephone, FAX machine, computer modems or a telephone answering and recording machine. The unit functions by allowing the telephone accessory unit to control where an incoming call will be received and/or answered. This control functions or follows when the telephone accessory unit is "on hook", the incoming call will be received at the telephone set allowing the set to answer the call and function under its normal mode of operation. However, if the telephone accessory unit is placed "off hook", the interface unit causes the telephone signal arriving at the telephone set to be routed automatically to and answered by the telephone accessory unit.

More specifically, suppose a cordless telephone is connected to the telephone line switching interface unit. When an incoming call arrives, the call may be normally answered by lifting the handset of the telephone set. If cordless operation is desired, the cordless handset is switched to TALK or "OFF hook". This operation will cause the interface unit to automatically switch the audio from the handset of the telephone set to the cordless telephone. To hang up, the cordless telephone is placed on STANDBY or OFF and the cordless handset is returned to its cradle.

When a FAX machine is connected to the interface unit, and a FAX is to be transmitted, the following steps are followed: the FAX machine is placed in the OFF position. The FAX dedicated telephone set is then used to make the call to the FAX destination. After the called FAX machine answers, the local FAX machine is switched to the transmit mode to send the FAX. This same approach is also used to operate a computer modem.

The telephone line switching interface unit consists of an enclosure that houses all the control electronic elements of the interface unit. The inputs and outputs of the interface unit are made via standard telephone modular connectors to facilitate and standardize the hookup of the interface unit with the telephone set and the telephone accessory unit. The control electronics is comprised of fourteen major elements that are listed and described in the BEST MODE FOR CARRYING OUT THE INVENTION section that follows.

One major problem that arises in connecting the interface unit to a telephone set is the lack of standardization in these telephone sets. This problem extends to the wiring configuration at the connectors of the telephone set and to telephone operational signal levels. The interface unit solves this problem in that one of the major elements, a telephone characteristic compensation switch, allows the interface unit to compensate for any difference in telephone sets and their corresponding wiring and signal levels.

In view of the above disclosure, it is the primary object of the invention to provide a telephone line switching interface unit that allows a telephone accessory unit when placed "off hook" to automatically receive a telephone signal that is first received at a remote telephone set.

In addition to the above objectives, it is also an object of the invention to have a unit that:
functions with a single or multi-line key system,
compensates for various models of telephone sets and wiring configurations,
utilizes modular connections for easy installation,
does not require any external modifications of the telephone set and
is reliable and easy to operate.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
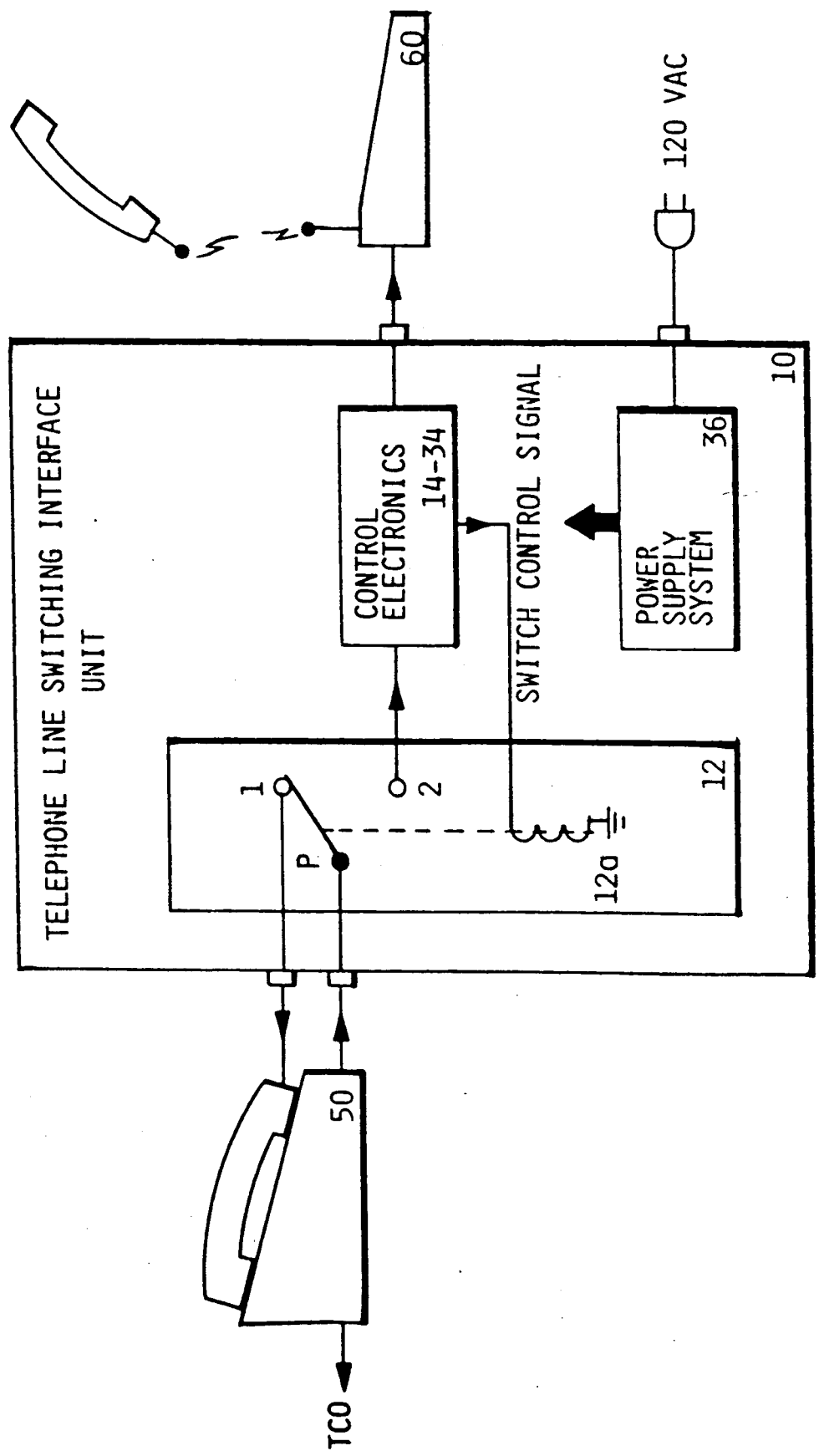
FIG. 1 is a simplified diagram depicting the operation of the telephone line switching interface unit.

The best mode for carrying out the telephone line switching interface unit 10 is presented in terms of a preferred embodiment that is comprised of the following major elements: a telephone handset-to-telephone accessory relay 12, a telephone characteristic compensation switch 14, a first isolation/matching transformer 16, a first gain-selection circuit 18, a first high-gain amplifier 20, a telephone hybrid circuit 22, a second high-gain amplifier 24, a second gain-selection circuit 26, a second isolation/matching transformer 28, a third isolation/matching transformer 30, an automatic accessory switching circuit 32, an output network 34, and a power supply system 36. The major elements function in combination with two non-inventive elements a telephone set 50 that includes a base unit and a handset; and a telephone accessory unit 60.

Before a detailed theory of operation is described, a simplified operation is presented. The unit 10, as shown in FIG. 1, is connected between the telephone set 50 and the telephone accessory unit 60. Within the unit 10 is located a switching means which in the preferred embodiment is the telephone handset-to-telephone accessory switching relay 12. The relay has a pole that selectively makes contact between a first contact and a second contact. The pole is connected to the base unit of the telephone set; the first contact is connected to the handset and the second contact is connected, via control electronics means 14-34, to the telephone accessory unit 60. The contact position of the relay 12 is controlled by the telephone accessory unit 60. When the accessory unit is "on hook", the relay is deenergized and the relay pole is connected to the first contact. In this configuration, the handset is connected to the base unit which allows the telephone set to function in its normal mode of operation. When the telephone accessory unit is placed "off hook", a switch control signal is produced by the control electronics means that energizes the relay coil causing the pole to move to the second position. In the second position, the telephone signal from the telephone central office (TCO) bypasses the handset of the telephone set 50 and is automatically routed and received by the telephone accessory unit 60.

Figure 2A:
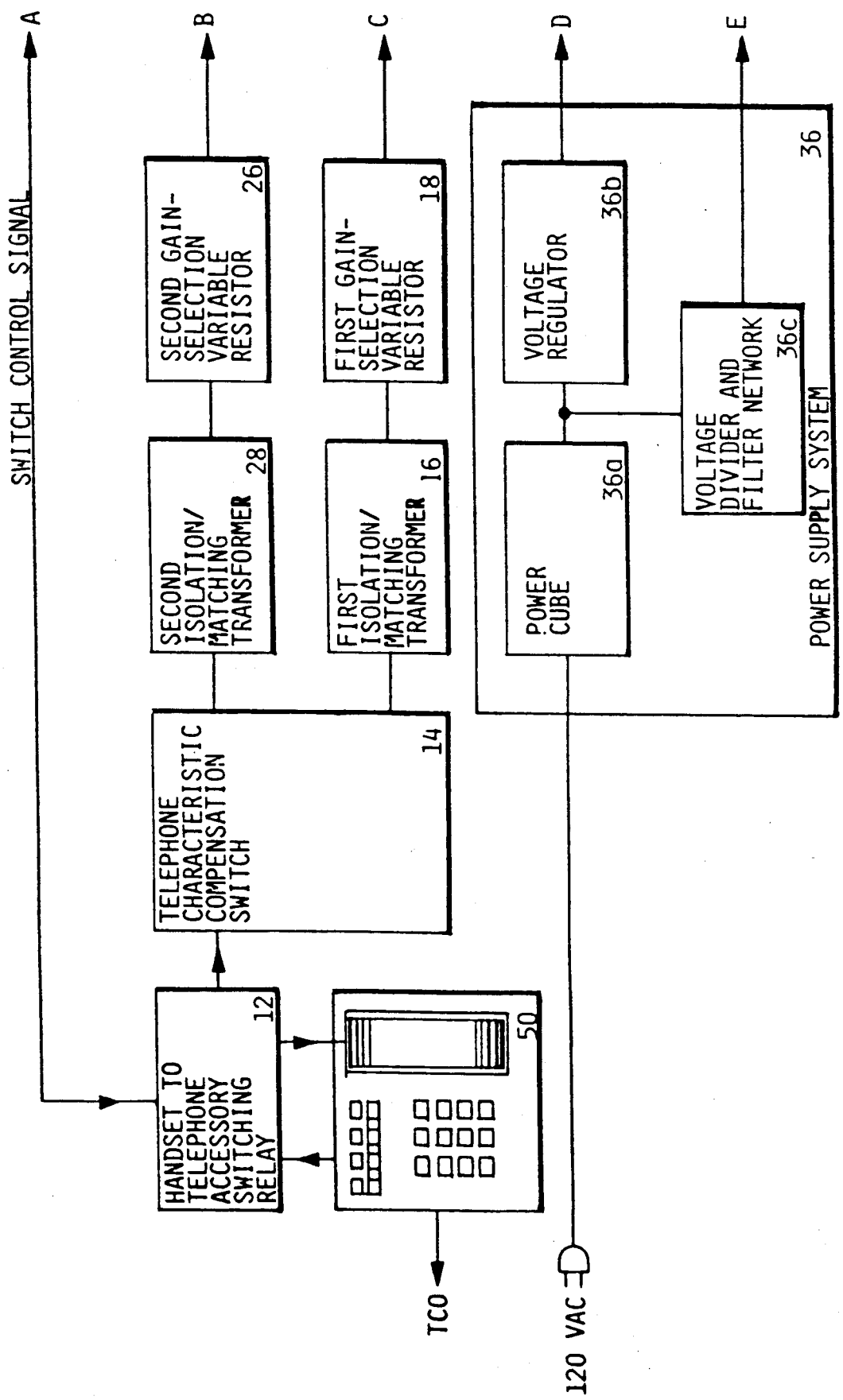
FIGS. 2A and 2B are complimentary block diagrams of the telephone line switching interface unit shown connected to a telephone set and a telephone accessory unit.
Figure 2B:
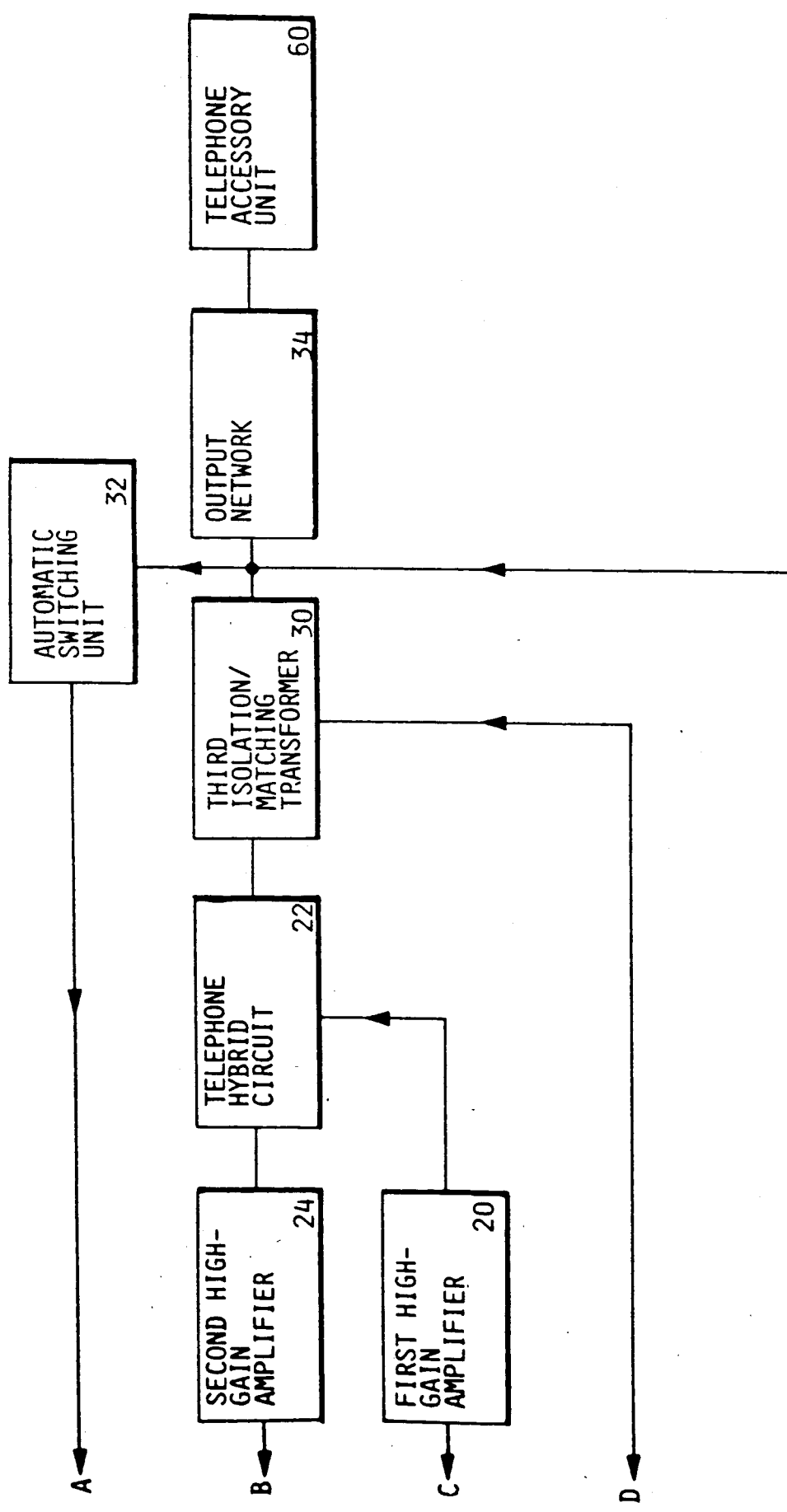
Figure 3A:
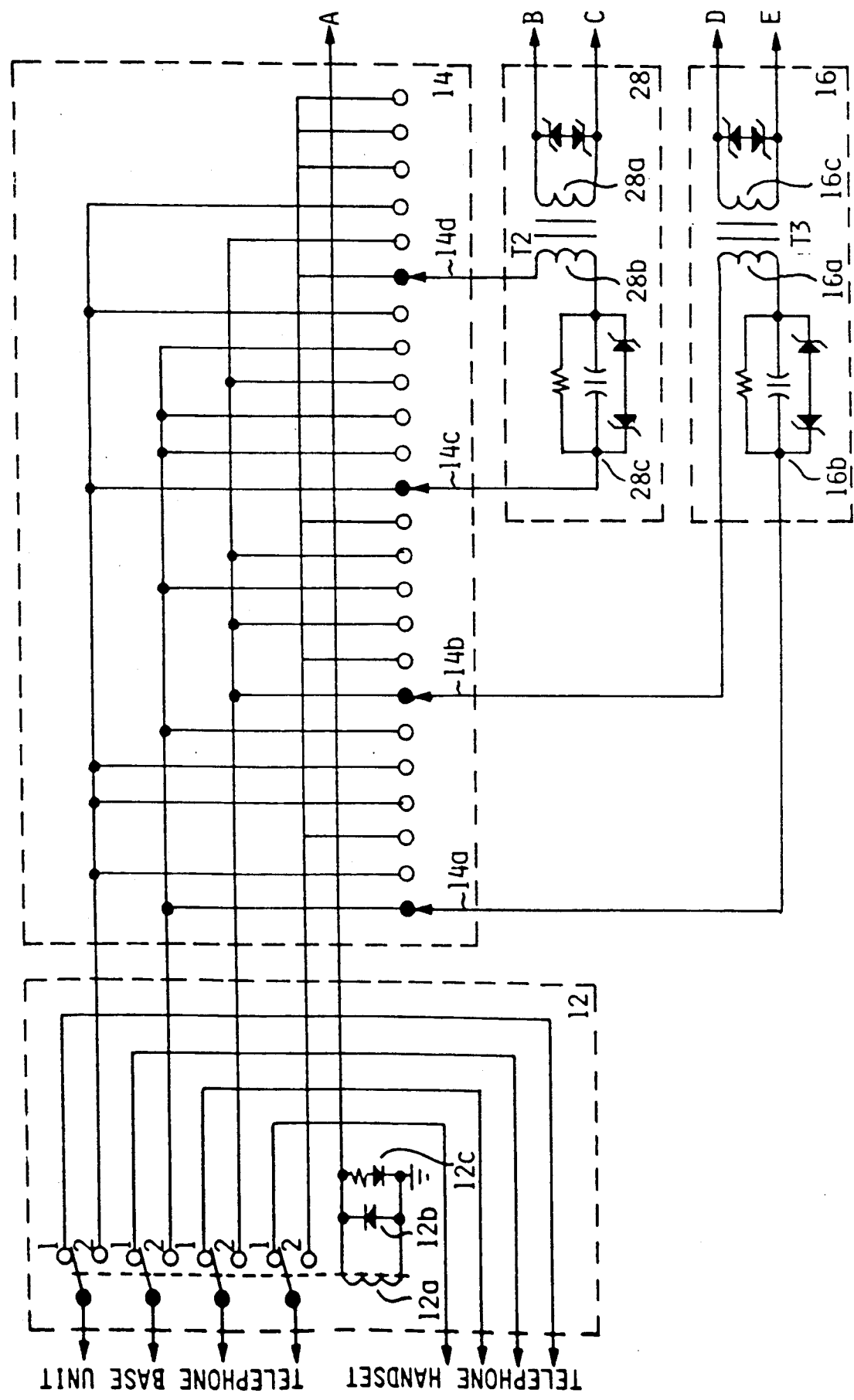
FIGS. 3A and 3B are complementary schematic diagrams of the telephone line switching interface unit positioned to correspond with the block diagrams of FIGS. 2A and 2B.
Figure 3B:
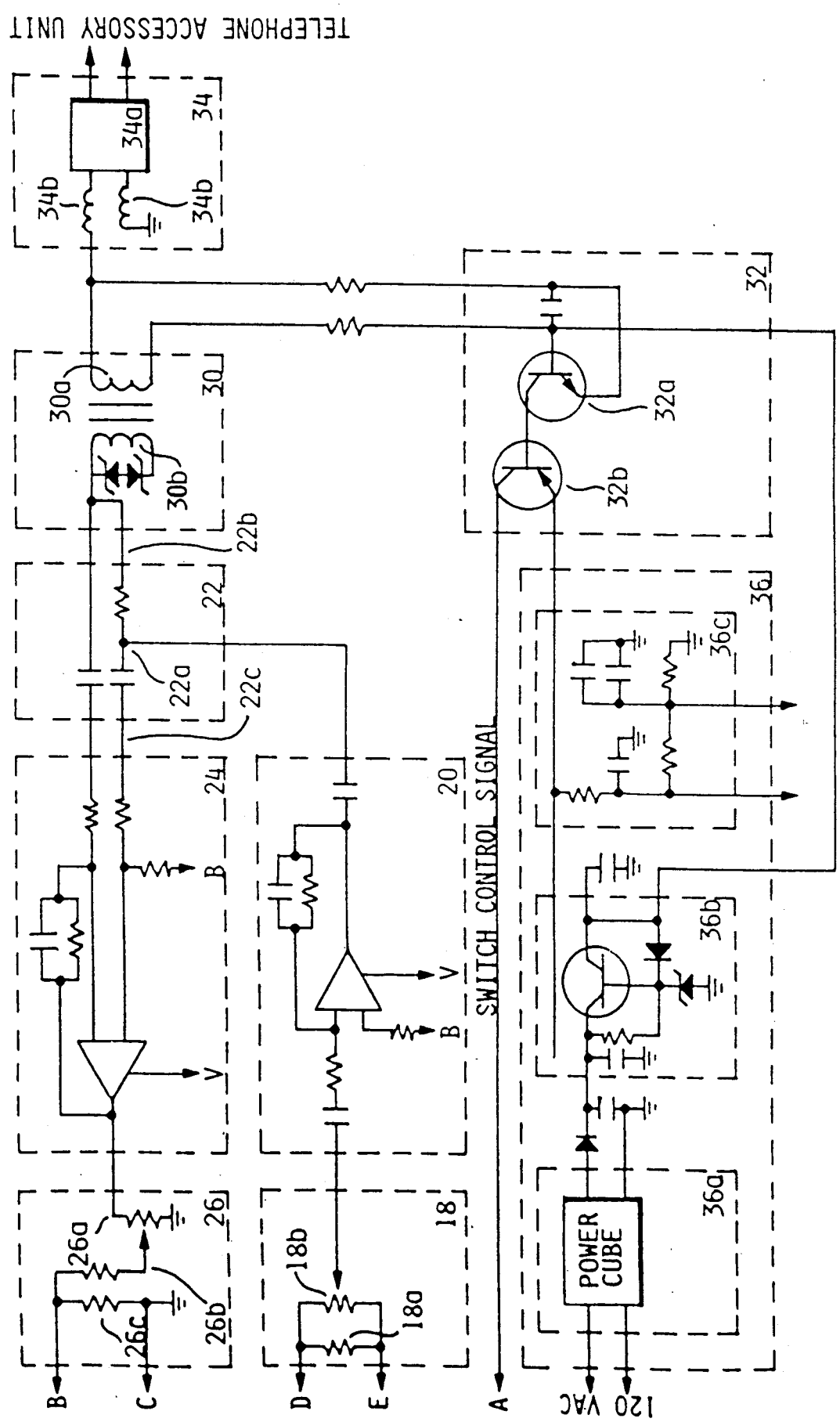

The remainder of the disclosure covers a detailed theory of operation and is made with reference to the block diagram of FIGS. 2A and 2B and the corresponding schematic of FIGS. 3A and 3B.

The input element to the unit 10 is the telephone handset-to-telephone accessory switching relay 12 The relay consists of a relay coil 12a that includes an inductive kick suppression diode 12b and an LED 12c that illuminates to indicate that the telephone accessory 60 is "off hook". The relay includes a plurality of poles, with four preferred, with a like plurality of contact sets with each contact set having a first contact and a second contact. The poles are connected, via a modular connector, to the base unit of the telephone set 50 and the first contact of each contact set is connected to the handset of the telephone set.

The switching relay provides the means by which an incoming telephone signal, being applied from the TCO to the telephone set can be switched to the telephone accessory 60. The switching occurs automatically when the telephone accessory unit 60 is placed "off hook" which, in turn, causes the switch control signal, from the automatic accessory switching circuit 32, to be applied to the relay coil 12a and energize the relay 12.

The second contacts of the switching relay are connected to a telephone characteristic compensation switch 14. This switch may be selected from various available types, however, in the preferred embodiment a slide switch having four sets of switches is preferred. Each switch set consists of a pole that controls six contacts connected to the second contacts of the relay 12. The compensation switch 14 is further characterized by a first pair of poles are comprised of poles 14a, 14b and a second pair of poles comprised of poles 14c, 14d. In general, there is no standardization of telephone sets and wiring configurations. Therefore, this switch and its associated wiring arrangement, as shown in FIG. 3A, provides for the wiring differences in the various models of telephone sets and telephone systems. Note, that the polarity of the signals is of no consequence since the audio is transformer coupled.

The first pair of poles 14a, 14b are applied across the primary winding 16a of the first isolation/matching transformer 16. This transformer provides the means to load and couple the incoming telephone signal from the telephone set 50 to the interface unit 10. As shown in FIG. 3A, to one side of the transformer primary 16a is connected, in series a d-c loading circuit 16b for a consists of a resistor in parallel with an audio coupling capacitor that is transient protected by a pair of back-to-back zener diodes. A pair of transient protection zener diodes are also connected across the secondary winding 16c of the transformer.

The secondary winding 16c of transformer 16 is connected across resistor 18a and the resistive element 18b of a variable resistor that comprises the first gain-selection circuit 18. The variable resistor 18b functions in combination with the fixed resistor 18a to provide the means for producing a wide variation in gain to allow the handset audio level to be raised to the audio level of the telephone signal. Although, as shown in FIG. 3, a variable resistor is preferred, a fixed resistor divider network may also be used to accomplish the gain selection.

The wiper 18c of the resistive element 18b is connected to the input of the first high-gain amplifier 20. This amplifier has roll offs that occur at 300 Hz and 3 KHz that allow acceptance of the audio level compensated signal from the first gain selection circuit 18. The output of this amplifier passes through the telephone hybrid circuit 22 to allow the telephone line source impedance to be correctly matched.

The telephone hybrid circuit 22, as shown in FIG. 3B, is comprised of an R-C network having a first input 22a supplied from the output of the first high-gain amplifier 20, a second input 22b supplied from the third isolation/matching transformer 30 and an output 22c that is applied to the second high-gain amplifier 24. The hybrid circuit, in combination with the loading provided by the first high-gain amplifier 20, the second high-gain amplifier 24 and the third isolation/matching transformer 30, provides the means to pass the incoming telephone signals from the telephone accessory 60, via a differential mode, to the second high-gain amplifier 24. The circuit 22 also passes the telephone signal from the first high-gain amplifier 20 to the third isolation/matching transformer 30 and causes the correct impedance to load the telephone accessory unit 60.

As stated above, the output of the hybrid circuit 22 is applied to the input of the second high-gain amplifier 24. This amplifier also has roll offs at 300 Hz and 3 KHz to allow acceptance of the telephone signals from the telephone accessory unit 60 applied through the third isolation/matching transformer 30 and the hybrid circuit 22. The amplifier 24 passes the signals to the second gain-selection variable resistor with sufficient gain to control the telephone set 50. The second gain-selection circuit 26 is basically the same as the first gain-selection circuit 18. The second circuit provides the means that allows the telephone accessory unit audio level to be raised to the audio level of the handset on the telephone set 50.

The output of the amplifier 24 is applied to the non-grounded side of the resistive element 26a of a variable resistor. The resistive element wiper 26b is connected to the non-grounded end of fixed resistor 26c.

The output of the second gain selection circuit 26 is taken across resistor 26c and is connected across the primary winding 28a of the second isolation/matching transformer 28. This transformer provides the means to load and couple the incoming telephone signal from the telephone accessory unit 60 to the telephone set 50. As shown in FIG. 3A, to one side of the second winding is connected in series a d-c loading circuit 28c for a standard telephone handset carbon microphone. The circuit 28c consists of a resistor in parallel with an audio coupling capacitor that is transient protected by a pair of back-to-back zener diodes. A pair of transient protection zener diodes is also connected to the primary winding 28a of the transformer.

The secondary winding 28b is connected across the second pair of poles 14c, 14d of the telephone characteristic compensation switch 14. This connection completes the telephone signal loop that is connected to the switch 14.

The second input to the telephone hybrid circuit, as shown in FIG. 3B, is derived from the secondary winding 30b of the third isolation/matching transformer 30. This transformer, provides the means to couple the telephone signals from the telephone hybrid circuit 22 via the primary winding 30a to the output network 34; and to conversely, couple the telephone signal from the telephone accessory unit 60 that is applied through the output network 34 to the telephone hybrid circuit 22. The transformer 30 also includes across its secondary winding 30b, a pair of back-to-back zener diodes that provide transient protection.

The third isolation/matching transformer 30 has a d-c resistance that produces a voltage that is sensed by the automatic switching circuit 32 when the telephone accessory unit is placed "off hook".

The automatic accessory switching circuit 32 is comprised of first transistor 32a and a second transistor 32b. The base and emitter of the first transistor are connected across the primary winding 30a of the third transformer 30 and its collector is connected to the base of the second transistor 32b. The collector of the second transistor, as shown in FIGS. 3A and 3B is connected to the relay coil 12a of the hardset-to-telephone accessory switching relay 12.

When the circuit 32 senses that the telephone accessory unit 60 has been placed in the "off hook" condition, a current flows through the third isolation/matching transformer 30 which bias the first transistor 32a "on". The turn on of the first transistor, in turn, causes the second transistor to also turn on to provide the switch control signal that energizes the relay coil 12a of the telephone handset-to-telephone relay 12. Upon this energization, the telephone signal that was initially received at the telephone set 50 is automatically routed and received by the telephone accessory unit 60.

The output network 34 has its input connected to the junction of the primary winding 30a of the third transformer 30 and the emitter of the first transistor 32a. The network output includes a standard modular connector 34a that allows the telephone accessory unit 60 to be easily connected and have its output applied to the third isolation/matching transformer 30. The output network includes a plurality of RF decoupling chokes 34b that remove any RF which may enter the interconnecting wiring and thus upset the internal circuitry of the telephone line switching interface unit 10.

The final element disclosed is the power supply system 36, which in the preferred embodiment, consists of power cube 36a, a transistor type voltage regulator 36b and voltage divider 36c. As shown in FIGS. 2A and 3B, the power cube 36a is connected to the utility power and has an output of 12-volts d-c. The output of the power cube is connected to the voltage regulator that has its output connected to the junction of the primary winding 30a of the third isolation/matching transformer 30 and to the base of the first transistor 32a. The regulator provides a stable and low noise source of current that simulates the telephone "loop current". A voltage divider 36c is also provided that provides the supply (V) and bias (B) voltages for the first and second high-gain amplifiers 20, 24.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

We claim:

1. A telephone line switching interface unit that allows a remotely located telephone accessory unit to automatically receive a telephone signal first received at a remotely located telephone set, said interface unit comprising:

a telephone signal switching means having a pole that selectively makes contact between a first contact and a second contact where the pole is connected to the base unit of said telephone set, the first contact is connected to the handset of said telephone set and the second contact is connected, via control electronics means, in said interface unit to said telephone accessory unit, where the contact position of said switching means is controlled by said telephone accessory unit such that when the telephone accessory unit is "on hook", said switching means is deenergized with the pole of said switching means connected to the first contact allowing said telephone set to operate in its normal mode and when the telephone accessory unit is "off hook", a switch control signal is produced by said control electronics means that energizes said switching means causing the pole to move to the second contact which disconnects the handset from the base unit of said telephone set and allows the telephone signal from the telephone central office to bypass the handset of said telephone set and be automatically routed and received by said telephone accessory unit; said control electronics means including telephone characteristic compensation switch means for compensating for various models of telephone sets and wiring configurations, said telephone characteristic compensation switch means having an input from said telephone signal switching means and further having first and second outputs; a first isolation matching transformer having an input from said first output of said telephone characteristic compensation switch means and having an output; a second isolation/matching transformer having an input connected to said second output of said telephone characteristic compensation switch means and having an output; a first gain-selection variable resistance having an input connected to said output of said firs isolation/matching transformer, and having an output; and a second gain-selection variable resistance having an input connected to said output of said second isolation/matching transformer, and having an output.

2. A telephone line switching interface unit as specified in claim 1 wherein said telephone accessory unit comprises a cordless telephone set.

3. The telephone line switching interface unit as specified in claim 1 wherein said telephone accessory unit comprises a FAX unit.

4. The telephone line switching interface unit as specified in claim 1 said telephone accessory unit comprises a computer modem.

5. The telephone line switching interface unit as specified in claim 1 wherein said telephone accessory unit comprises a telephone answering/recording machine.

6. The telephone line switching interface unit as specified in claim 1 said telephone accessory unit comprises a standard telephone set.

7. The telephone line switching interface unit as specified in claim 1 said telephone set comprises a multi-line telephone system also known as a key system.

8. A telephone line switching interface unit that allows a remotely located telephone accessory unit to automatically receive a telephone signal first received at a remotely located telephone set, said interface unit comprising:

a) a telephone handset-to-telephone accessory switching relay having a relay coil and a plurality of poles and a like plurality of contact sets with each contact set having a first contact and a second contact, where the poles are connected to the base unit of said telephone set and the first contact of each contact set is connected to the handset of said telephone set, b) a telephone characteristic compensation switch having a first pair of poles and a second pair of poles where each pole controls a plurality of contacts that are connected to the second contacts of said switching relay, c) a first isolation/matching transformer having a primary winding and a secondary winding, with the primary winding connected across the first pair of poles on said compensation switch, d) a first gain-selection circuit comprising a variable resistor having a resistive element controlled by a resistive element wiper that is connected to a fixed resistor to ground, where the resistive element is connected across the secondary winding of said first isolation/matching transformer, e) a first high-gain amplifier having its input connected to the junction of the resistive element wiper and fixed resistor of said first gain-selection circuit, f) a telephone hybrid circuit comprising an R-C network having a first input that is connected to the output of said first high-gain amplified with said hybrid circuit also having a second input and an output, g) a second high-gain amplifier having its input connected to the output of said telephone hybrid circuit, h) a second gain-selection circuit comprising a variable resistor having a resistive element controlled by a resistive element wiper that is connected to a fixed resistor to ground and to the output of said second high-gain amplifier, i) a second isolation/matching transformer having a primary winding connected across the resistive element of said second gain-selection variable resistor and a secondary winding that is connected across the second pair of poles on said compensation switch, j) a third isolation/matching transformer having a primary winding and a secondary winding connected to the second input of said telephone hybrid circuit, k) an automatic accessory switching circuit comprising a first transistor and a second transistor where the base and emitter of the first transistor are connected across the primary winding of said third isolation/matching transformer and its collector is connected to the base of said second transistor, with the collector of said second transistor connected to the relay coil of said handset-to-telephone accessory switching relay, l) an output network having its input connected to the junction of the primary winding of said third isolation/matching transformer and the emitter of said first transistor and where its output is applied to the telephone accessory unit, and m) a power supply system comprising:
  (1) a power cube connected to the utility power source and having an output of 12-volts d-c,
  (2) a voltage regulator having its input connected to said power cube and its output connected to the junction of the primary winding of said third isolation/matching transformer and the base of said first transistor, and
  (3) a voltage divider and filter network connected to the intersection of said power cube and said voltage regulator, where said network supplies the voltages required by said high-gain amplifiers.

9. The unit as specified in claim 8 wherein said telephone handset-to-telephone accessory switching relay provides the means by which an incoming telephone signal being applied from the telephone central office to said telephone set, can be switched to said telephone accessory unit, where the switching occurs automatically when a switch control signal energizes said switching relay, where said relay control signal is produced when said telephone accessory unit is placed "off hook".

10. The unit as specified in claim 8 wherein said telephone characteristic compensation switch has the means to compensate for wiring differences in various models of telephone sets and telephone systems.

11. The unit as specified in claim 8 wherein said first isolation/matching transformer provides the means to load and couple the incoming telephone signal from said telephone set to said interface unit.

12. The unit as specified in claim 8 wherein the variable resistor of said first gain-selection circuit functions in combination with the fixed resistor to provide the means for producing a wide variation in gain to allow the handset audio level to be raised to the audio level of the telephone signal.

13. The unit as specified in claim 8 wherein said first high-gain amplifier has roll offs at 300 Hz and 3 KHz to allow acceptance of the audio level compensated signal from said first gain TM selection circuit and where the output of said first high-gain amplifier passes through said telephone hybrid to allow the telephone line source impedance to be correctly matched.

14. The unit as specified in claim 8 wherein said telephone hybrid circuit in combination with the loading provided by said first high-gain amplifier, said second high-gain amplifier and said third isolation/matching transformer provides the means to pass the incoming telephone signals from said telephone accessory unit, via a differential mode, to said second high-gain amplifier and to also pass the telephone signal from said first high-gain amplifier to said third isolation/matching transformer and causes the correct impedance to load said telephone accessory unit.

15. The unit as specified in claim 8 wherein said second high-gain amplifier has roll offs at 300 Hz and 3 KHz to allow acceptance of the telephone signals applied from said telephone accessory unit via said third isolation/matching transformer and said telephone hybrid circuit and passing the signals to said second gain-selection variable resistor with sufficient gain to control said telephone set.

16. The unit as specified in claim 8 wherein the variable resistor of said second gain-selection circuit functions in combination with the fixed resistor to provide the means that allows the telephone accessory audio level to be raised to the audio level of the handset on said telephone set.

17. The unit as specified in claim 8 wherein said second isolation/matching transformer provides the means to load and couple the incoming telephone signal from said telephone accessory unit to said telephone set.

18. The unit as specified in claim 8 wherein said third isolation/matching transformer provides the means to couple the telephone signals from said telephone hybrid circuit to said output network and to couple the telephone signals from said telephone accessory unit via said output network to said hybrid telephone circuit, where said third isolation/matching transformer has a d-c resistance that produces a voltage that is sensed by said automatic switching circuit when said telephone accessory unit is "off hook".

19. The unit as specified in claim 8 wherein said automatic accessory switching circuit senses when said telephone accessory unit goes "off hook" at which time a current flows through said third isolation/matching transformer which bias the first transistor "on" causing the second transistor to also turn "on" to provide a switch control signal that energizes the relay coil of said telephone handset-to-telephone accessory relay and automatically allows the telephone signal initially received at said telephone set to be received at said telephone accessory unit.

20. The unit as specified in claim 8 wherein said output network includes a standard modular connector that allows said telephone accessory unit to be connected to said third isolation/matching transformer, where said output network further comprises a plurality of RF decoupling chokes that remove any RF which may enter the interconnecting wiring and thus upset the internal circuitry of said telephone line switching interface unit.

21. The unit as specified in claim 8 wherein said power supply system is designed to provide the required voltage and current to power said telephone line switching interface unit.

22. A telephone line switching interface unit that allows a remotely located telephone accessory unit to automatically receive a telephone signal first received at a remotely located telephone set, said interface unit comprising:

A telephone signal switching means having a pole that selectively makes contact between a first contact and a second contact where the pole is connected to the base unit of said telephone set, the first contact is connected to the handset of said telephone set and the second contact is connected, via control electronics means, in said interface unit to said telephone accessory unit, where the contact position of said switching means is controlled by said telephone accessory unit such that when the telephone accessory unit is "on hook", said switching means is deenergized with the pole of said switching means connected to the first contact allowing said telephone set to operate in its normal mode and when the telephone accessory unit is "off hook", a switch control signal is produced by said control electronics means that energizes said switching means causing the pole to move to the second contact which disconnects the handset from the base unit of said telephone set and allows the telephone signal from the telephone central office to by-pass the handset of said telephone set and be automatically routed and received by said telephone accessory unit;

wherein said telephone signal switching means includes a telephone handset-to-telephone accessory switching relay having a relay coil and a plurality of poles and a like plurality of contact sets with each contact set having a first contact and a second contact, where the poles are connected to the base unit of said telephone set and the first contact of each contact set is connected to the handset of said telephone set; and wherein said control electronics means includes:
a) a telephone characteristic compensation switch having a first pair of poles and a second pair of poles where each pole controls a plurality of contacts that are connected to the second contacts of said switching relay,
b) a first isolation/matching transformer having a primary winding and a secondary winding, with the primary winding connected across the first pair of poles on said compensation switch,
c) a first gain-selection circuit comprising a variable resistor having a resistive element controlled by a resistive element wiper that is connected to a fixed resistor to ground, where the resistive element is connected across the secondary winding of said first isolation/matching transformer,
d) a first high-gain amplifier having its input connected to the junction of the resistive element wiper and fixed resistor of said first gain-selection circuit,
e) a telephone hybrid circuit comprising an R-C network having a first input that is connected to the output of said first high-gain amplifier, with said hybrid circuit also having a second input and an output,
f) a second high-gain amplifier having its input connected to the output of said telephone hybrid circuit,
g) a second gain-selection circuit comprising a variable resistor having a resistive element controlled by a resistive element wiper that is connected to a fixed resistor to ground and to the output of said second high-gain amplifier,
h) a second isolation/matching transformer having a primary winding connected across the resistive element of said second gain-selection variable resistor and a secondary winding that is connected across the second pair of poles on said compensation switch,
i) a third isolation/matching transformer having a primary winding and a secondary winding connected to the second input of said telephone hybrid circuit,
j) an automatic accessory switching circuit comprising a first transistor and a second transistor where the base and emitter of the first transistor are connected across the primary winding of said third isolation/matching transformer and its collector is connected to the base of said second transistor, with the collector of said second transistor connected to the relay coil of said handset-to-telephone accessory switching relay,
k) an output network having its input connected to the junction of the primary winding of said third isolation/matching matching transformer and the emitter of said first transistor and where its output is applied to the telephone accessory unit, and
l) a power supply system comprising:
(1) a power cube connected to the utility power source and having an output of 12-volts d-c,
(2) a voltage regulator having its input connected to said power cube and its output connected to the junction of the primary winding of said third isolation/matching transformer and the base of said first transistor, and
(3) a voltage divider and filter network connected to the intersection of said power cube and said voltage regulator, where said network supplies the voltages required by said high-gain amplifiers.

23. The telephone line switching interface unit as specified in claim 22 wherein said telephone accessory unit comprises a cordless telephone set.

24. The telephone line switching interface unit as specified in claim 22 wherein said telephone accessory unit comprises a FAX unit.

25. The telephone line switching interface unit as specified in claim 22 wherein said telephone accessory unit comprises a telephone answering/recording machine.

26. The telephone line switching interface unit as specified in claim 22 wherein said telephone accessory unit comprises a standard telephone set.

27. The telephone line switching interface unit as specified in claim 22 wherein said telephone set comprises a multi-line telephone system also known as a key system.

* * * * *